US011270593B2

(12) United States Patent
Molnar et al.

(10) Patent No.: US 11,270,593 B2
(45) Date of Patent: Mar. 8, 2022

(54) ADVISORY METHOD AND SYSTEM FOR FLIGHT TRAJECTORY OPTIMIZATION

(71) Applicant: HONEYWELL INTERNATIONAL INC., Morris Plains, NJ (US)

(72) Inventors: Karol Molnar, Kanice (CZ); Eva Gelnarova, Brno (CZ); Kalimulla Khan, Karnataka (IN); Srihari Jayathirtha, Karnataka (IN); Raghu Shamasundar, Karnataka (IN); Visakh S, Karnataka (IN); Chavdar Kirov, Sofia (BG); Ivan Markov, Sofia (BG)

(73) Assignee: Honeywell International Inc., Charlotte, NC (US)

( * ) Notice: Subject to any disclaimer, the term of this patent is extended or adjusted under 35 U.S.C. 154(b) by 236 days.

(21) Appl. No.: 16/577,867

(22) Filed: Sep. 20, 2019

(65) Prior Publication Data

US 2021/0090445 A1 Mar. 25, 2021

(51) Int. Cl.

| | |
|---|---|
| ***G08G 5/00*** | (2006.01) |
| ***G01C 23/00*** | (2006.01) |
| ***G05D 1/00*** | (2006.01) |

(52) U.S. Cl.

CPC ......... *G08G 5/0039* (2013.01); *G08G 5/0013* (2013.01); *G08G 5/0021* (2013.01)

(58) Field of Classification Search

CPC .. G08G 5/0039; G08G 5/0013; G08G 5/0021; G08G 5/0082; G08G 5/0091;

(Continued)

(56) References Cited

U.S. PATENT DOCUMENTS 5,121,325 A * 6/1992 DeJonge .............. G05D 1/0005 244/182
6,057,786 A * 5/2000 Briffe ..................... G01C 23/00 340/974

(Continued)

FOREIGN PATENT DOCUMENTS

| | | |
|---|---|---|
| EP | 3154047 A1 | 4/2017 |
| WO | 2018071377 | 4/2018 |

OTHER PUBLICATIONS

European Search Report and Written Opinion dated Feb. 8, 2021, in counterpart European Patent Application No. EP 20197069 (11 pages, in English).

(Continued)

*Primary Examiner* — Yonel Beaulieu

(74) *Attorney, Agent, or Firm* — Bookoff McAndrews, PLLC

(57) ABSTRACT

Methods and systems are provided for optimization of an aircraft flight trajectory with shortcuts. The method comprises retrieving an active flight plan stored in a flight management system (FMS) and identifying a potential shortcut with a shortcut advisor tool. The FMS monitors the location of the aircraft with respect to an identified start point of the potential shortcut. Prior to the aircraft's arrival at the identified start point, current key performance indicators (KPI) of the shortcut are evaluated with the shortcut advisor tool. The aircrew is alerted to the potential shortcut along with a preview of the performance of the aircraft upon accepting the potential shortcut. The aircrew may accept the addition of the potential shortcut to the flight plan and request approval of the shortcut by air traffic control (ATC). The active flight plan is updated with the shortcut upon approval from the ATC.

26 Claims, 6 Drawing Sheets

(58) Field of Classification Search
CPC .. G08G 5/00; G08G 5/04; G08G 1/16; G05D 1/00; B64C 15/00; G01S 2205/002; G01S 2205/003; G01S 2205/005; G01C 23/00; G01C 23/005
See application file for complete search history.

(56) References Cited

U.S. PATENT DOCUMENTS

| | | | | |
|---|---|---|---|---|
| 6,134,500 | A * | 10/2000 | Tang | G06Q 10/047 701/10 |
| 8,509,968 | B1 | 8/2013 | Saccone et al. | |
| 8,600,675 | B1 | 12/2013 | Borghese et al. | |
| 8,977,482 | B2 | 3/2015 | Ballin et al. | |
| 9,086,280 | B2 | 7/2015 | Gurusamy et al. | |
| 9,460,629 | B2 | 10/2016 | Chircop et al. | |
| 9,697,737 | B2 | 7/2017 | Hale et al. | |
| 9,911,339 | B2 * | 3/2018 | Lax | G08G 5/0095 |
| 9,965,961 | B2 | 5/2018 | Agrawal | |
| 10,055,116 | B2 | 8/2018 | Coulmeau et al. | |
| 10,102,753 | B2 | 10/2018 | Bailey et al. | |
| 10,325,504 | B2 * | 6/2019 | Meier | G01C 21/20 |
| 10,330,493 | B2 * | 6/2019 | Shamasundar | G01C 23/005 |
| 10,360,804 | B2 * | 7/2019 | De Prins | G08G 5/0091 |
| 10,373,507 | B2 * | 8/2019 | Marcella | G08G 5/025 |
| 11,016,988 | B1 * | 5/2021 | Watson | G06T 11/203 |
| 11,017,677 | B2 * | 5/2021 | Martinez | G08G 5/0052 |
| 11,074,819 | B2 * | 7/2021 | Subramaniyan | G07C 5/085 |
| 2006/0142903 | A1 * | 6/2006 | Padan | F41G 9/002 701/3 |
| 2011/0130897 | A1 * | 6/2011 | Gladysz, Jr. | G01C 23/00 701/15 |
| 2013/0080043 | A1 * | 3/2013 | Ballin | G08G 5/0078 701/120 |
| 2014/0163850 | A1 * | 6/2014 | Sawhill | G08G 5/0013 701/120 |
| 2016/0093217 | A1 | 3/2016 | Hale et al. | |
| 2016/0180715 | A1 | 6/2016 | Burke et al. | |
| 2017/0090482 | A1 | 3/2017 | Zammit-Mangion et al. | |
| 2017/0372619 | A1 | 12/2017 | Borgyos | |
| 2018/0075758 | A1 | 3/2018 | Martinez et al. | |
| 2018/0090015 | A1 | 3/2018 | Mere | |
| 2018/0261106 | A1 | 9/2018 | de Oliveira et al. | |
| 2020/0211069 | A1 * | 7/2020 | Chaubey | G08G 5/0039 |
| 2021/0276728 | A1 * | 9/2021 | Mast | B64D 45/00 |

OTHER PUBLICATIONS

Lewis, M.; Advisory Systems Save Time, Fuel for Airlines; NASA, Nov. 8, 2018.
Durham, M.; InFlight Optimization Services Offers Airlines More Fuel-Efficient En-Route Operations; Nov. 8, 2018.
Flight Trajectory Optimization on Airway Networks; Zuse Institute Berlin (ZIB); Nov. 8, 2018.
Flight Data Analytics Platform and Trajectory Optimization Tools; GoDirect Flight Efficiency; Nov. 8, 2018.

* cited by examiner

ADVISORY METHOD AND SYSTEM FOR FLIGHT TRAJECTORY OPTIMIZATION

STATEMENT REGARDING SPONSORED RESEARCH OR DEVELOPMENT

The project leading to this application has received funding from the SESAR Joint Undertaking under grant agreement No 734161 under European Union's Horizon 2020 research and innovation program.

TECHNICAL FIELD

The present invention generally relates to aircraft operations, and more particularly relates to an advisory method and system for flight trajectory optimization.

BACKGROUND

Lateral shortcuts along the active flight path are an effective option to reduce the trip fuel and time. These operations are often used by airlines to compensate for delays during takeoff and en-route. Lateral shortcuts are not part of published routes and they are usually identified by analyzing historical flight data by flight monitoring or fuel efficiency services. The approval for shortcuts and the savings potential is ultimately a dynamic decision based on the current weather, traffic and aircraft performance. Hence, there is a need for an advisory method and system for flight trajectory optimization.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for providing optimization of an aircraft flight trajectory with shortcuts. The method comprises: retrieving an active flight plan stored in a flight management system (FMS) located on board an aircraft; identifying a potential shortcut for the active flight plan with a shortcut advisor tool; monitoring the location of the aircraft with the FMS, where the location of the aircraft is monitored with respect to an identified start point of the potential shortcut; evaluating current key performance indicators (KPI) for the potential shortcut prior to the aircraft's arrival at the identified start point, where the KPI are evaluated with the shortcut advisor tool; alerting the aircrew of the aircraft to the potential shortcut with the shortcut advisor tool, where the alert includes a preview of the performance of the aircraft upon accepting the potential shortcut; accepting the addition of the potential shortcut to the flight plan of the aircraft by the aircrew; requesting approval of the accepted shortcut by air traffic control (ATC) via a data communications network; and updating the active flight plan stored in the FMS to include the addition of the accepted shortcut upon receiving approval from the ATC.

A system is provided for providing optimization of an aircraft flight trajectory with shortcuts. The system comprises: a flight management system (FMS) located on board an aircraft, where the FMS contains an active flight plan for the aircraft; an electronic flight bag (EFB) that is in a wireless communication with the FMS; and a shortcut advisor tool loaded on the EFB, where the shortcut advisor tool, retrieves the active flight plan stored in the FMS, identifies a potential shortcut for the active flight plan, evaluates current key performance indicators (KPI) for the potential shortcut prior to the aircraft's arrival at the identified start point of the potential shortcut, and alerts the aircrew of the aircraft to the potential shortcut, where the alert includes a preview of the performance of the aircraft that is calculated by the shortcut advisor tool upon accepting the potential shortcut.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
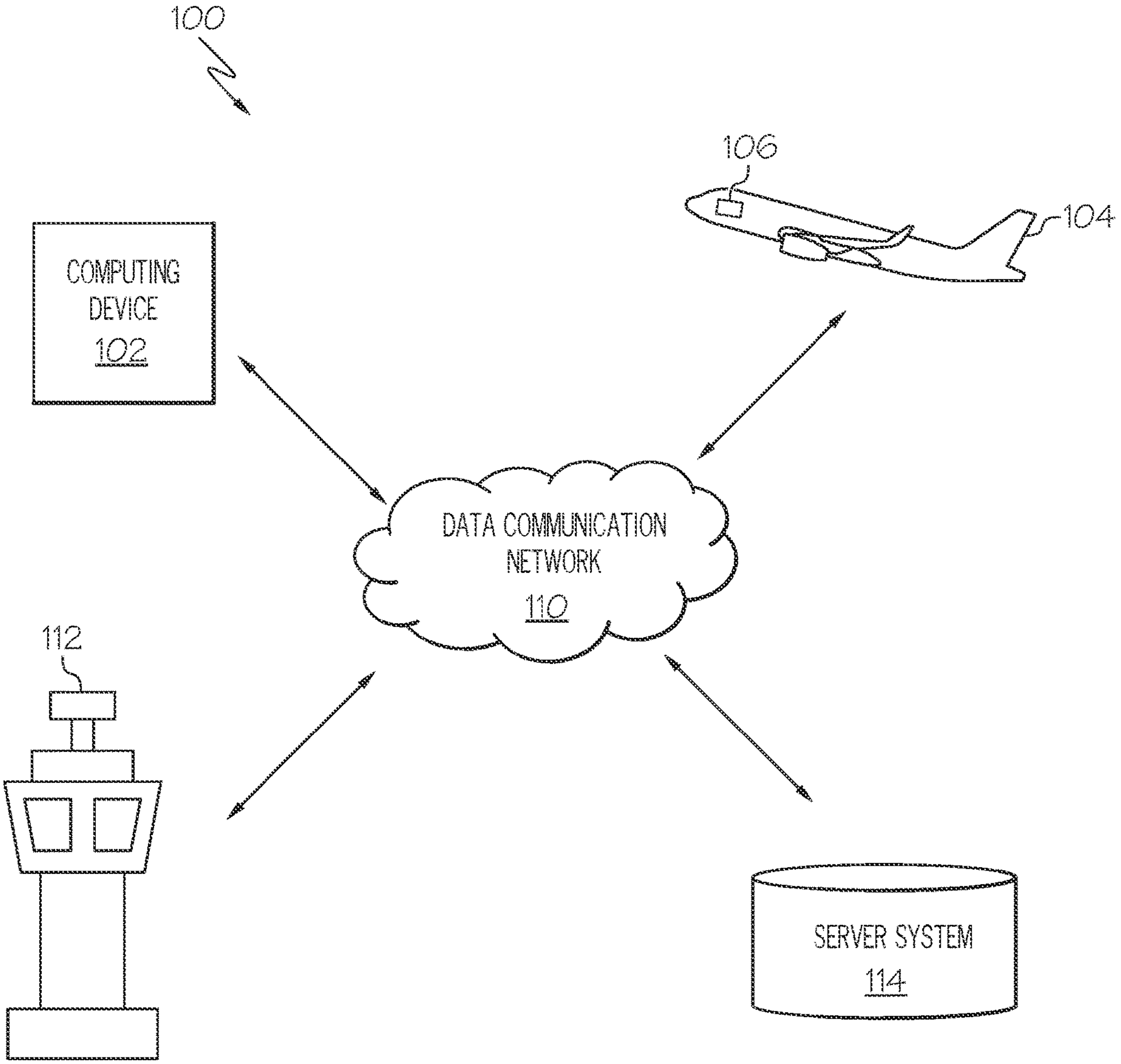
FIG. 1 is a diagram of a system for providing optimization of an aircraft flight trajectory with shortcuts in accordance with one embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for providing optimization of an aircraft flight trajectory with shortcuts has been developed. The method involves retrieving an active flight plan for an aircraft and identifying potential shortcuts with a shortcut advisor tool application. A start point for the shortcut is identified. As the aircraft approaches the start point of the potential shortcut, current key performance indicators (KPI) for the potential shortcut are evaluated and the aircrew of the aircraft is alerted to the potential shortcut along with a preview of the performance of the aircraft upon accepting the potential shortcut. The aircrew must decide whether to accept the potential shortcut to the flight plan and then request approval of the accepted shortcut by air traffic control (ATC). Upon receiving approval from the ATC, the active flight plan is updated to include the accepted shortcut.

As used herein, charts may be any aviation chart or aeronautical chart provided as an informational aid to a flight crew for flight planning purposes. Chart data is any data provided by an electronic chart or a data driven chart (DDC). Aircraft generally use electronic charts for providing a flight crew member with information specific to a particular route and/or airport. Electronic charts may include airport maps; intersections and taxiways data; procedures and data associated with approach, arrival, and departure; and any flight constraints associated with a current flight plan. A flight plan is a proposed strategy for an intended flight, includes details associated with the intended flight such as intermediate waypoints along the flight path, and is usually filed with an aviation authority (e.g., Federal Aviation Administration). An intended flight may also be referred to as a "trip" and extends from a departure airport at the beginning point of the trip, to any waypoints, and on to a destination airport at the endpoint of the trip. An alert may be any signal or warning indicating potential non-compliance with constraints associated with the current flight plan. The alert may be implemented as a display of text and/or graphical elements, a sound, a light, or other visual or auditory warning signal onboard the aircraft.

Turning now to the figures, FIG. 1 is a diagram of a system 100 for providing optimization of an aircraft flight trajectory with shortcuts, in accordance with the disclosed embodiments. The system 100 operates with a current flight of the aircraft 104, to continuously monitor flight data and parameters during flight. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present emergency alerts when flight constraints may not be satisfied by the current flight of the aircraft 104. In other embodiments, the computing device 102 may be implemented using a computer system onboard the aircraft 104, which is configured to determine and present such emergency alerts.

The aircraft 104 may be any aviation vehicle for which flight constraints and alerts associated with non-compliance with flight constraints are relevant and applicable during completion of a flight route. The aircraft 104 may be implemented as an airplane, helicopter, spacecraft, hovercraft, or the like. The one or more avionics systems 106 may include a Flight Management System (FMS), crew alerting system (CAS) devices, automatic terminal information system (ATIS) devices, Automatic Dependent Surveillance—Broadcast (ADS-B), Controller Pilot Data Link Communication (CPDLC), navigation devices, weather radar, aircraft traffic data, and the like. Data obtained from the one or more avionics systems 106 may include, without limitation: an approved flight plan, an estimated time of arrival, instructions from air traffic control (ATC), Automatic Terminal Information Service (ATIS) data, flight plan restriction data, onboard equipment failure data, aircraft traffic data, weather data, or the like.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine compliance and/or non-compliance with constraints associated with the current flight. Such data may include, without limitation: flight plan data, flight plan constraint data, and other data compatible with the computing device 102.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

An operational flight plan (OFP) is a flight operator's plan for the safe conduct of the flight. Among other essential information, the OFP contains the route description made up by waypoints connected with route segments. The waypoints and route segments between them (airways) are published in an aeronautical information publication (AIP). However, based on local regulatory rules the operator may also include unpublished direct connections between waypoints in the OFP. In cases of a regular flight between city-pairs, the operator usually develops multiple alternative company routes. These company routes are optimized to reflect operator's preferences, common environmental and operational constraints in the vicinity of the trajectory, etc.

Based on the conditions which are expected to be valid at a time when the flight is about to be performed, the most appropriate company route is selected for that particular flight. Next, the Operational Flight Plan (OFP) is then filed for validation to the respective authority, e.g. EUROCONTROL Integrated Initial Flight Plan Processing System service (IMW), FAA Flight Service Station, etc. If the filed flight plan (FPL) is accepted by the authority, the crew is expected to perform the flight in accordance with the filed route. However, due to events such as weather avoidance, unplanned changes in air traffic management (ATM) infrastructure availability, separation management, etc., the crew might be instructed by ATC or might request the ATC to modify the approved route. Based on mutual agreement between the crew and ATC the flight trajectory may be modified in flight, usually, in order to improve flight safety and efficiency.

Figure 2:
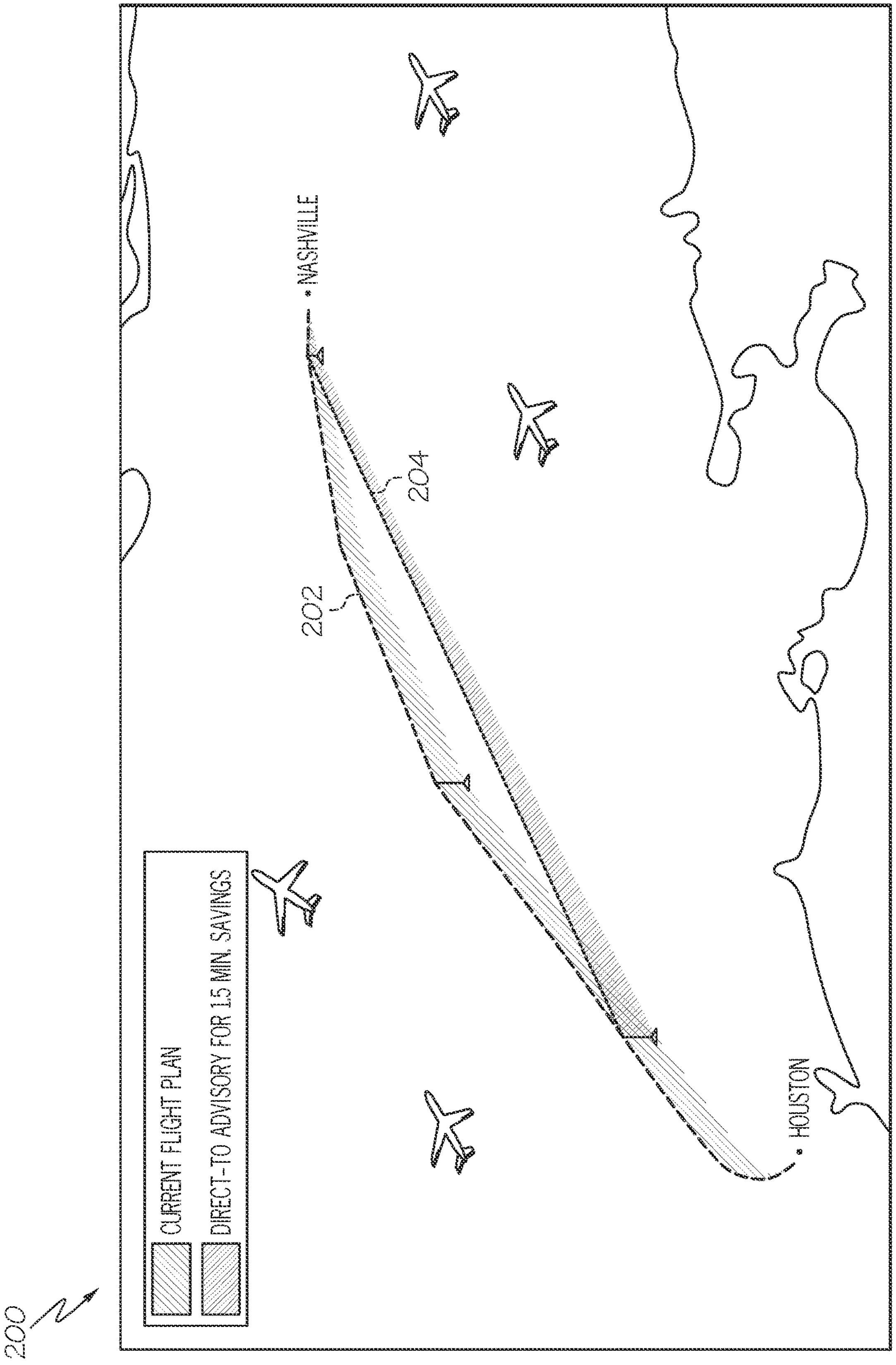
FIG. 2 is a display of an aircraft flight plan with a shortcut in accordance with one embodiment.
Figure 3A:
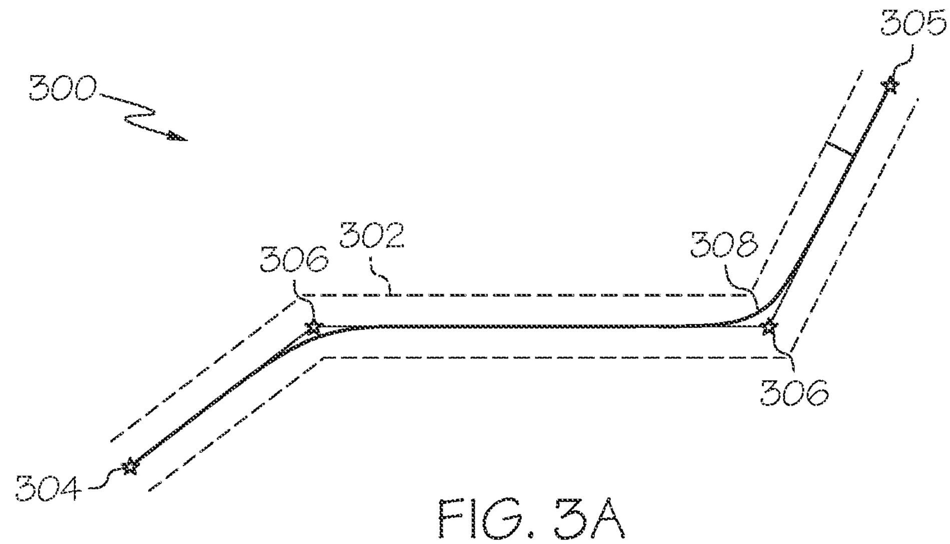
FIGS. 3A-3C are diagrams of a flight plan trajectory with shortcuts and vectors between waypoints in accordance with one embodiment.
Figure 3B:
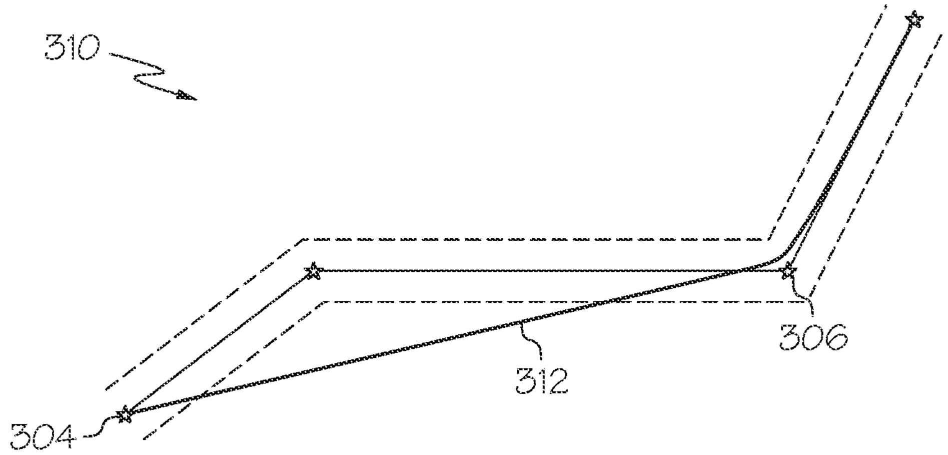
Figure 3C:
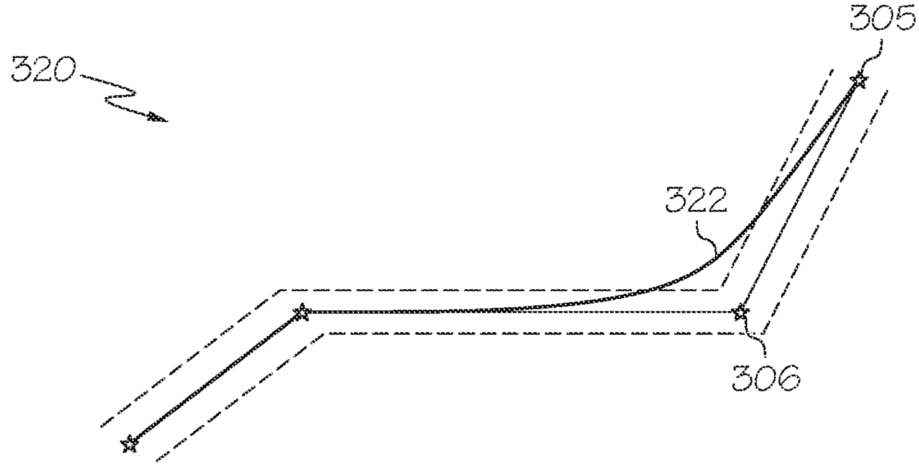

FIG. 2 shows an example of a display 200 of an operational flight plan 202 along with a modified shortcut 204 in accordance with one embodiment. FIGS. 3A-3C show diagrams of a flight plan trajectory with shortcuts and vectors between waypoints in accordance with one embodiment. Specifically, FIG. 3A shows a diagram 300 of an operational flight plan 302 with a start point 304 and end point 305. Two separate waypoints 306 are located along the flight path. The actual flight trajectory 308 of the aircraft is overlaid on the operational flight plan 302. In FIG. 3B, a diagram 310 is shown of the operational flight plan with a shortcut 312 between the start point 304 and a waypoint 306. In FIG. 3C, a diagram 320 is shown of the operational flight plan with a vector 322 that bypasses a waypoint 306 to reach the end point 305 of the operational flight plan.

In flight operations all the dispatchers, flight crew and air traffic controllers are aware that any approved deviation from the operational flight plan must not compromise flight safety and actual weather conditions should have no negative impact on flight efficiency. If these factors can be satisfied, a potential change to the approved flight plan does can be made to better adjust the planned trajectory with the optimal trajectory. The ability for pilots, ground controllers and supporting systems (EFB, mobile tablets, smart phones, etc.) to make smarter decisions about optimizing flight trajectories with much better situational awareness based on networked and shared data will significantly increase flight efficiency and economy.

In some embodiments, a shortcut advisor tool software application is utilized that offers real time monitoring of Key Performance Indicators (KPI) in addition to analysis of historical flight data. This integration of real-time application is expected to increase the fuel savings of the operator by 1-2% ensuring effective application of the KPIs and historic data. This solution could be monetized for significant cost savings per aircraft. The system enhances the use of potential shortcuts offering by providing: real-time advisories to increase compliance with a shortcut; real-time evaluation of shortcut opportunities; analysis or shortcut opportunities based on historical flight records and data; and effective collaboration between aircrew, controllers and operations.

There are two steps when the OFP may be optimized. The first step is during the development of a company route when the basic flight plan may be improved based on empirical knowledge of the dispatchers or flight crew. The second way to further optimize the OFP is during the flight based on the latest information about environmental and operational constraints. In these cases, the crews and ATC rely on their own professional experience to agree on modification of the flight-plan which will maintain the required level of flight safety and flight efficiency. However, in both cases the personal experience and professional excellence of involved parties has an essential impact on the efficiency of final flight path.

Figure 4:
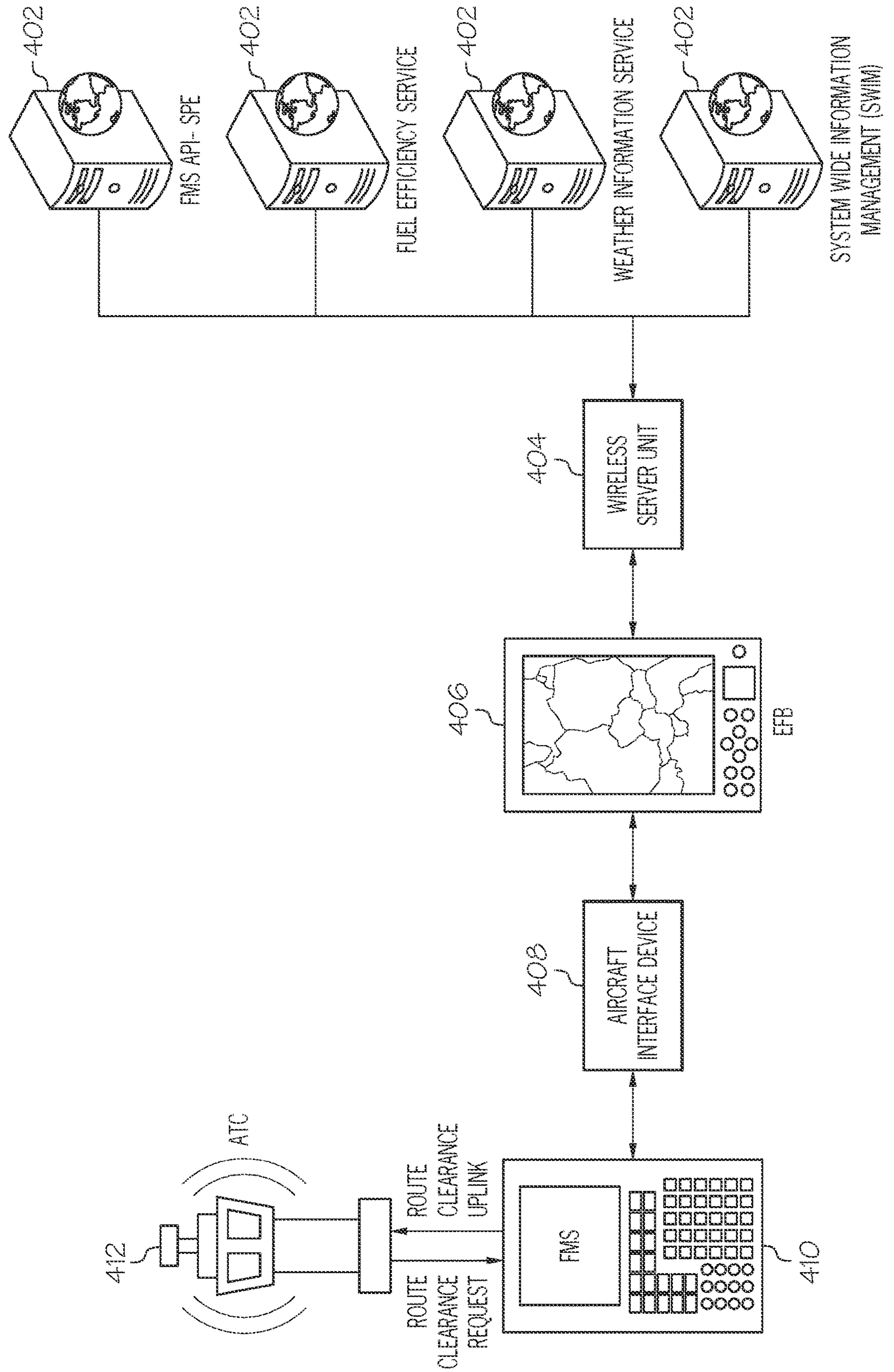
FIG. 4 is a diagram of a system for providing optimization of shortcuts for an aircraft flight trajectory in accordance with one embodiment.

FIG. 4 shows a diagram 400 of a system for providing optimization of shortcuts for an aircraft flight trajectory in accordance with one embodiment. The flight management system (FMS) 410 and electronic flight bag (EFB) 406 are part of the computing device 102 previously shown in FIG. 1. The aircraft interface device (AID) 408 and the wireless server unit (WSU) 404 are part of the data communications network 110 shown previously in FIG. 1. The multiple resource servers 402 are part of the ground-based server system 114 shown previously in FIG. 1.

The shortcut advisory tool software application is hosted on an EFB 406 that is located on board the aircraft. The EFB 406 is connected to aircraft avionics components such as an FMS 410 through an AID 408. The AID 408 streams real-time flight data parameters as well as the flight data plan to and from these devices. The EFB 406 is connected to multiple ground-based server systems 402 through a WSU 404. The ground-based server systems 402 provide real-time weather information, real-time air traffic conditions, fuel efficiency data, historical flight data, etc. This data and information is used by the shortcut advisor tool to calculate and evaluate the KPI for a potential shortcut. Once a potential shortcut is identified, evaluated and presented to the aircrew for acceptance via the FMS 410, the aircrew will request approval of the potential shortcut from the ATC 412 via a root clearance uplink.

The FMS 410, as is generally known, is a specialized computer that automates a variety of in-flight tasks such as in-flight management of the flight plan. Using various sensors such as global positioning system (GPS), the FMS 410 determines the aircraft's position and guides the aircraft along its flight plan using its navigation database. From the cockpit, the FMS 410 is normally controlled through a visual display device such as a control display unit (CDU) which incorporates a small screen, a keyboard or a touchscreen. The FMS 410 displays the flight plan and other critical flight data to the aircrew during operation.

The FMS 410 may have a built-in electronic memory system that contains a navigation database. The navigation database contains elements used for constructing a flight plan. In some embodiments, the navigation database may be separate from the FMS 410 and located onboard the aircraft while in other embodiments the navigation database may be located on the ground and relevant data provided to the FMS 410 via a communications link with a ground station. The navigation database used by the FMS 410 may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 410 to modify the plight flight plan before takeoff or even while in flight for variety of reasons. Such changes may be entered via the CDU. Once in flight, the principal task of the FMS 410 is to accurately monitor the aircraft's position. This may use a GPS, a VHF omnidirectional range (VOR) system, or other similar sensor in order to determine and validate the aircraft's exact position. The FMS 410 constantly cross checks among various sensors to determine the aircraft's position with accuracy.

Additionally, the FMS 410 may be used to perform advanced vertical navigation (VNAV) functions. The purpose of VNAV is to predict and optimize the vertical path of the aircraft. The FMS provides guidance that includes control of the pitch axis and of the throttle of the aircraft. In order to accomplish these tasks, the FMS 410 has detailed flight and engine model data of the aircraft. Using this information, the FMS 410 may build a predicted vertical descent path for the aircraft. A correct and accurate implementation of VNAV has significant advantages in fuel savings and on-time efficiency.

Figure 5:
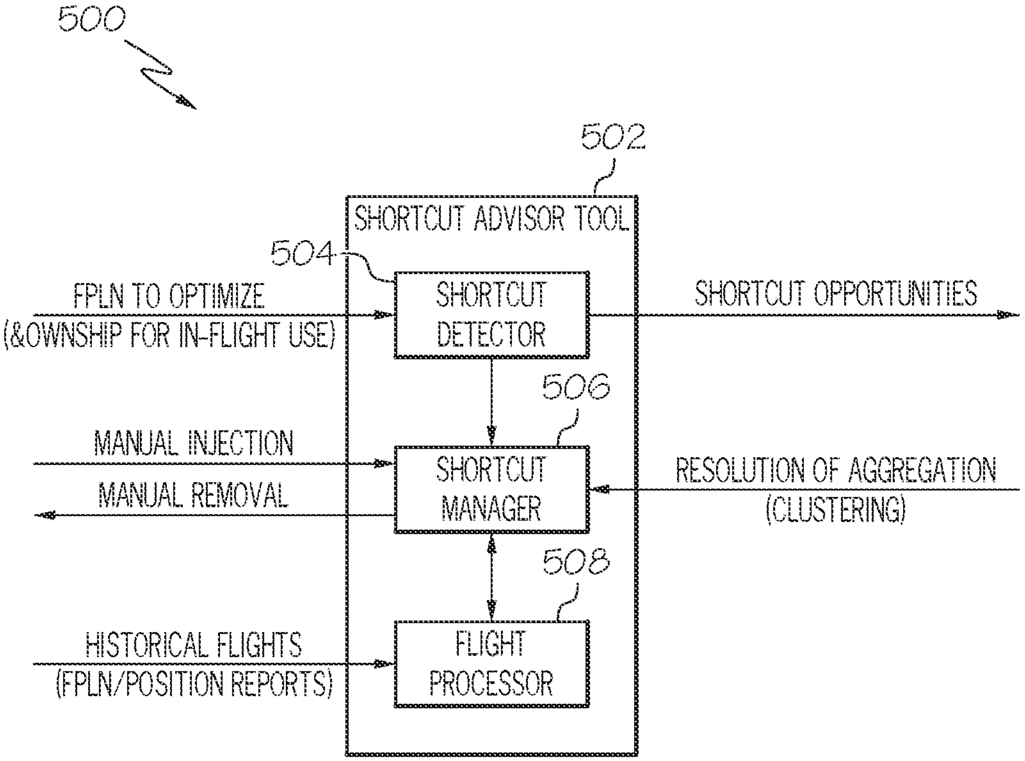
FIG. 5 is a diagram of a shortcut advisor tool in accordance with one embodiment.

Turning now to FIG. 5, a diagram 500 is shown of a shortcut advisor tool 502 in accordance with one embodiment. The shortcut advisor tool 502 is a software application that is loaded on the EFB 406 shown previously in FIG. 4. The tool comprises three key elements: the flight processor 508; the shortcut manager 506; and th to e shortcut detector 504. The flight processor 508 reads the records describing historical flights between a given city-pair and detects situations when the real flight has deviated from the original trajectory. The flight processor 508 is capable to identify mutual relations between the planned and flown flight trajectory. A deviation detection algorithm identifies the beginning and end positions of the deviation. If the actually flown flight path is shorter than the originally planned trajectory, the flight processor 508 provides information about this shortcut to the shortcut manager 506.

The shortcut manager 506 receives shortcuts identified by the flight processor 508, aggregates them with other previously stored shortcuts. A dedicated input allows for classifying shortcuts into clusters. The shortcut manager 506 also supports manual injection of shortcuts identified using alternative routes and manual removal of shortcuts which have become irrelevant (e.g. due to changes in infrastructure).

The shortcut detector 504 operates according to one of two possible process flows. First, the shortcut detector may operate in on-request mode for ground use. The request is initiated by receipt of a new flight plan. Using the records available through the shortcut manager 506, it searches for potential shortcuts between waypoints which make up the flight-plan under consideration. If a shortcut is found, it is provided to the output of the shortcut advisor tool 502. If there is no suitable shortcut found, the shortcut advisor tool 502 indicates the lack of relevant routes.

Alternatively, the shortcut detector 504 operates in continuous mode and regularly receives the latest flight plan (e.g., the FMS flight plan and the latest position of the aircraft). Using the records available through the shortcut manager 506, it searches for potential shortcuts between the current position and waypoints towards the destination. If a shortcut is found, it is provided to the output of the shortcut advisor tool 502. If no suitable shortcut is found, the shortcut advisor tool 502 will not provide any special notice to the crew.

The shortcut advisor tool 502 is intended to detect fuel and time saving opportunities via indication of shortcut opportunities with respect to the original flight plan and based on assumption that shorter flight path leads to lower fuel consumption. The tool 502 may improve the flight plan optimization process while reducing the dependency on individual experience and the effort required from involved parties. In different embodiments, the shortcut advisor tool 502 could be used as during either ground operations or airborne operations. During ground operations, the tool 502 is relevant for a later phase of the flight preparation process, when it is expected that the preliminary flight plan is sufficiently mature. As a prerequisite, a database 402 as shown in FIG. 4, of pairs of reference points for given region of interest with at least one historical flight will be used as a reference. The database 402 should contain direct connections between two published waypoints with no officially published route segment between them and alternative regions of waypoints. The shortcut advisor tool 502 is used to search for pairs of reference points in the database.

The shortcut advisor tool 502 then reads the preliminary flight plan and identifies the waypoints making up to flight trajectory. Various waypoint pairs are compared with historical data is retrieved from the database 402. If there is no shortcut used in the past for any of the waypoint pairs, the preliminary flight plan will continue to be used. However, if a shortcut has been used between two waypoints, the shortcut is indicated to the ground dispatcher. The dispatcher will modify the flight plan to reflect the identified shortcut for validation by the corresponding authority. If the corresponding authority approves the flight plan, preflight preparation including fuel consumption planning, etc. is performed for the shorter trajectory. Additionally, details of the shortcut and the flight planning are saved for future reference.

During airborne operations, a database 402 of pairs of reference points for a given region of interest is referenced. The database 402 should contain at least one historical flight with direct connections between two published waypoints with no officially published route segment between them. The database 402 may alternatively contain direct connections from an unpublished reference point to a published waypoint. The shortcut advisor tool 502 is used to search for pairs of reference points in the database 402. The tool 502 accesses the active flight plan including in-flight changes to identify the waypoints making up the flight trajectory. The shortcut advisor tool 502 then obtains the aircraft's location and identifies the next planned waypoint in the active flight plan. The tool 502 next searches for potential shortcuts between the current position and the next planned waypoint. If a shortcut is identified, it is indicated to the flight crew. If the flight crew excepts the potential shortcut, the crew will request approval from the ATC. If the ATC approves the shortcut, the crew will update the flight plan and continue the flight using the approved shortcut. If the shortcut is not approved, the flight will continue according to the last confirmed active flight plan. Additionally, details of the shortcut and the flight planning are saved for future reference. During the flight, compliance with the shortcut advisory is recorded and saved by monitoring the pilot's actions at the time of issuance of the shortcut advisory.

Each historical flight should be saved as an individual record to the database 402 containing at least: the operational flight plan; the departure airport; the destination airport; time and date of departure and arrival; sets of waypoints fully defining the plan flight trajectory; and aircraft position records. The waypoints evaluated by the shortcut advisor tool 502 should contain at least the identifiers of the waypoint and its coordinates. Additionally, each waypoint record should include reference to the starting position, reference to the in position, and any other supplementary information. Finally, other records of the flight should include the regularly updated aircraft position and the flight plan changes. Post flight, a summary the shortcut performance is generated and shown in a dashboard format on the display. The performance display shows adherence to the shortcut advisory and potential v. actual savings in time and fuel during the flight. The post flight summary also allows the pilot to enter feedback in text form or predefined comments (e.g., unable to comply due to ATC restrictions, savings negligible, etc.).

Figure 6:
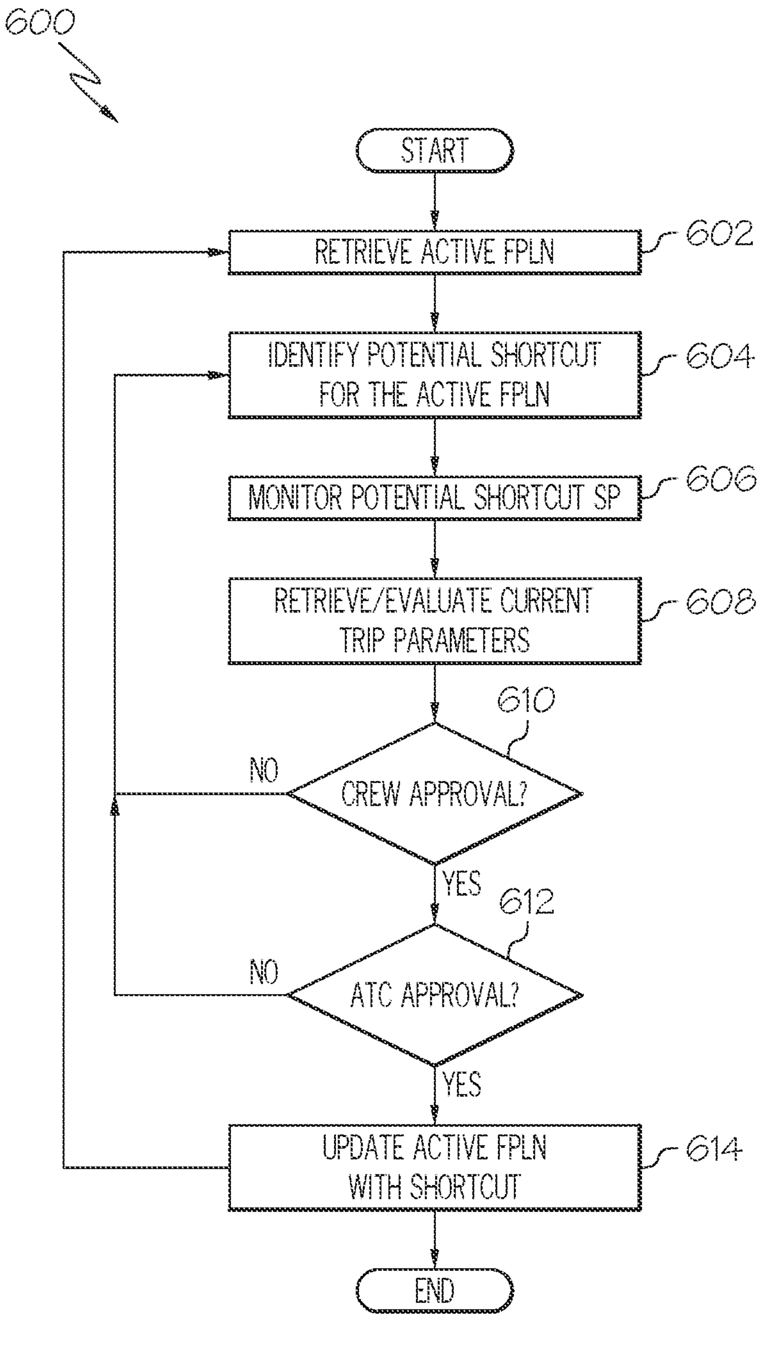
FIG. 6 is a flowchart of a method for providing optimization of an aircraft flight trajectory with shortcuts in accordance with one embodiment.

Turning now to FIG. 6, a flowchart is shown of a method for providing optimization of an aircraft flight trajectory with shortcuts in accordance with one embodiment. First, an active flight plan is retrieved from the FMS located on board the aircraft 602. The flight plan may be retrieved during preflight planning and procedures for the aircraft or during the flight of the aircraft. Potential shortcuts for the active flight plan are identified with the shortcut advisor tool 604. In some embodiments, the shortcut advisor tool 502 is an application that is loaded on an EFB 406. In other embodiments, the shortcut advisor tool 502 is loaded on a mobile communications device such as an electronic tablet or a smart phone. Potential shortcuts may be identified based on historical flight records that are retrieved from a historical flight data base 402. The historical flight records may be categorized by time and date to help identify air traffic patterns along the flight plan.

The location of the aircraft is monitored by the FMS with respect to identified start point of the potential shortcuts 606. As the aircraft approaches the start point of the potential shortcut, the shortcut advisor tool evaluates current key performance indicators (KPI) for the shortcut 608. In some embodiments, the KPI may include real-time weather conditions and real-time traffic conditions along the potential shortcut. The shortcut advisor tool 502 alerts the aircrew of the aircraft to the potential shortcut while providing a preview of the performance of the aircraft upon accepting the potential shortcut to the active flight plan. The alerts for the aircrew may be either visual or audio or both. The preview of the performance of the aircraft may include fuel savings and/or time savings upon acceptance of the potential shortcut.

The aircrew may then decide whether or not to accept the potential shortcut 610. The aircrew may accept the potential shortcut to the flight plan manually or via voice command. If the shortcut is accepted, approval for the shortcut is it requested from air traffic control (ATC) via a data communications network 612. Upon receiving approval from the ATC, the active flight plan is updated to include the shortcut and stored in the FMS 614. If the shortcut is not accepted by the crew or not approved by the ATC, the system will continue to identify potential shortcuts for the active flight plan 604 until the aircraft reaches its final destination. In alternative embodiments, an air operations center (AOC) may be updated with the active flight plan that includes the accepted shortcut. This updated active flight plan may be stored in a historical flight data base for future reference. The updated active flight plan that is stored may also include the performance data of the aircraft while executing the shortcut.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A non-transitory computer readable medium storing instruction that, when executed by one or more processors, cause the one or more processors to perform a method comprising:

retrieving, an active flight plan of an aircraft, from a flight management system (FMS) of the aircraft;

determining, on-board the aircraft, a potential alternative route which is different than the active flight plan for the aircraft, wherein determining the potential alternative route is based on at least one of: historical flight records, historical flight performance, the active flight plan, real-time weather information, real-time air traffic conditions, and fuel efficiency data corresponding to the aircraft;

monitoring a location of the aircraft with respect to an identified start point of the potential alternative route;

evaluating key performance indicators (KPI) with respect to the flight of the aircraft, wherein the evaluation is performed prior to arrival of the aircraft at the identified start point;

providing, on-board the aircraft, a visualization of predicted performance of the aircraft, in case the potential alternative route is used for the flight of the aircraft, wherein the predicted performance of the aircraft is determined based on the evaluation;

receiving a selection of the potential alternative route to be used for the flight of the aircraft;

in response to the selection, transmitting, via a data communication network, an approval request for approval of the potential alternative route to a route approval authority;

in response to receiving approval, transmitting a command to the FMS to update the active flight plan by incorporating the potential alternative route; and sending a command to a system on-board aircraft to operate the flight of the aircraft according to the potential alternative route.

2. The non-transitory computer readable medium of claim 1, wherein retrieving the active flight plan of the aircraft is performed during one of:

preflight planning for the aircraft; and during the flight of the aircraft.

3. The non-transitory computer readable medium of claim 1, wherein the historical flight records comprises at least one of: an operational flight plan (OFP), a departure airport, a destination airport, time and date of departure and arrival, sets of waypoints defining a plan flight trajectory, and aircraft position records and wherein the OFP comprises route description made up by waypoints connected with route segments, wherein the waypoints and the route segments are published in an aeronautical information publication (AIP), and wherein the waypoints contain at least one of: an identifier, coordinates, reference to a starting position, reference to an in position.

4. The non-transitory computer readable medium of claim 1, wherein the KPI comprises at least one of:

real time weather conditions along the potential alternative route; and real time air traffic conditions along the potential alternative route.

5. The non-transitory computer readable medium of claim 1, the non-transitory computer readable medium storing instruction that, when executed by the one or more processors, cause the one or more processors to perform the method, further comprising providing a notification comprising at least one of: a display of text, graphical elements, a sound, a light, and auditory warning signal, indicative of a potential non-compliance with constraints associated with at least one of: the active flight plan and the potential alternative route.

6. The non-transitory computer readable medium of claim 1, further comprising providing the visualization of the predicted performance of the aircraft includes a preview which is indicative of at least one of: fuel savings upon updating the active flight plan to include the potential alternative route and time savings upon updating the active flight plan to include the potential alternative route.

7. The non-transitory computer readable medium of claim 1, further comprising receiving the selection of the potential alternative route by at least one of: a first input provided on a visual interface and a second input provided via a voice command.

8. The non-transitory computer readable medium of claim 1, further comprising displaying at least one of:

the active flight plan along with the potential alternative route; and a summary of performance of the aircraft, post flight, wherein the summary describes at least one of: comparison between potential savings and actual savings in time and fuel during flight of the aircraft.

9. The non-transitory computer readable medium of claim 8, further comprising providing a visual interface that allows a pilot to enter feedback in at least one of a text form, wherein the feedback is indicative of reason for non-selection of the potential alternative route due to at least one of: inability to comply due to restriction of the route approval authority and savings negligible.

10. The non-transitory computer readable medium of claim 1, wherein the determination of the potential alternative route comprises:

locating the identified start point and an end point on the active flight plan;

locating two separate waypoints along the active flight plan; and determining a vector that bypasses at least one waypoint to reach the end point of the active flight plan.

11. The non-transitory computer readable medium of claim 1, further comprising:

providing information specific to at least one of a particular route and airport using electronic charts, wherein the electronic charts comprise at least one of: airport maps, intersections and taxiways data, procedures and data associated with approach, arrival, and departure, and flight constraints associated with the active flight plan.

12. The non-transitory computer readable medium of claim 1, the non-transitory computer readable medium storing instruction that, when executed by the one or more processors, cause the one or more processors to perform the method, further comprising:

(i) searching in a historical database, for a pair of reference points in a region of interest associated with the active flight plan, wherein the pair of reference points comprises at least one of:

two published way points with no published route segment between the way points; and an unpublished way point and a published way point in connection with each other; and (ii) accessing the active flight plan comprising an in-flight changes to identify a set of way points making up a flight trajectory;

(iii) identifying a next planned way point in the active flight plan based on the location aircraft; and (iv) identifying an alternate route based on (i), (ii), and (iii).

13. A system, comprising:

a processor configured to:

retrieve an active flight plan of an aircraft from a flight management system (FMS) of the aircraft;

determine, on-board the aircraft, a potential alternative route which is different than the active flight plan for the aircraft, wherein the potential alternative route is determined based on at least one of: historical flight records, historical flight performance, the active flight plan, real-time weather information, real-time air traffic conditions, and fuel efficiency data corresponding to the aircraft;

monitor a location of the aircraft with respect to an identified start point of the potential alternative route;

evaluate key performance indicators (KPI) with respect to the flight of the aircraft, wherein the evaluation is performed prior to arrival of the aircraft at the identified start point;

provide, on-board the aircraft, a visualization of predicted performance of the aircraft, in case the potential alternative route is used for the flight of the aircraft, wherein the predicted performance of the aircraft is determined based on the evaluation;

receive a selection of the potential alternative route to be used for the flight of the aircraft;

in response to the selection, transmit, via a data communication network, an approval request for approval of the potential alternative route to a route approval authority;

transmit a command to the FMS to update the active flight plan by incorporating the potential alternative route in response to receiving the approval; and send a command to a system on-board aircraft to operate the flight of the aircraft according to the potential alternative route.

14. The system of claim 13, wherein the location of the aircraft is monitored along the active flight plan using at least one of: a global positioning system (GPS), a VHF omnidirectional range (VOR) system, and a navigational database, and wherein the navigation database includes at least one of: waypoints, intersections, airways, radio navigation aids, navigation beacons, airports, runway, standard instrument departure (SID) information, standard terminal arrival (STAR) information, holding patterns, and instrument approach procedures, information manually defined by pilots along the active flight plan.

15. The system of claim 13, further comprising the processor communicatively coupled to an FMS, wherein the processor is further configured to:

exchange data via an aircraft interface device (AID), wherein the data comprises at least one of: real-time flight data parameters and active flight data plan.

16. The system of claim 13, further comprising an FMS communicatively coupled to the processor, wherein the processor is further configured to:

perform advanced vertical navigation (VNAV) functions to predict and optimize a vertical path of the aircraft;

provide guidance on control of a pitch axis and of a throttle of the aircraft based on a flight and engine model data of the aircraft; and build a predicted vertical descent path for the aircraft.

17. The system of claim 13, further configured to identify next potential alternative routes for the active flight plan until the aircraft reaches its final destination in response to determining that the potential alternative route is not selected.

18. An electronic flight bag (EFB) system comprising:

a processor configured to:

retrieve an active flight plan of an aircraft from a flight management system (FMS) of the aircraft;

determine, on-board the aircraft, a potential alternative route which is different than the active flight plan for the aircraft, wherein determining the potential alternative route is based on at least one of: historical flight records, historical flight performance, the active flight plan, real-time weather information, real-time air traffic conditions, and fuel efficiency data corresponding to the aircraft;

evaluate key performance indicators (KPI) with respect to the flight of the aircraft, wherein the evaluation is performed prior to arrival of the aircraft at a start point of the potential alternative route;

provide, on-board the aircraft, a visualization of predicted performance of the aircraft, in case the potential alternative route is used for flight of the aircraft, wherein the predicted performance of the aircraft is determined based on the evaluation;

update a selection of the potential alternative route to be used for the flight of the aircraft; and update the active flight plan in the FMS to incorporate the potential alternative route upon receiving an approval.

19. The EFB of claim 18, further comprising a display configured to present at least one of:

the active flight plan along with the potential alternative route;

a summary of performance of the aircraft, post flight, wherein the summary describes at least one of: adherence to the potential alternative route, comparison between potential savings and actual savings in time and fuel during flight of the aircraft, and wherein the summary displayed allows a pilot to enter feedback in at least one of a text form, wherein the feedback is indicative of reason for non-selection of the potential alternative route due to at least one of: inability to comply due to restrictions of the route approval authority and savings negligible; and a notification in response to determining that at least one flight constraint is not satisfied by the current flight of the aircraft in response to determining that the at least one flight constraint is not satisfied by a current flight of the aircraft.

20. The EFB of claim 18, wherein the processor is further configured to evaluate the KPI for the potential alternative route based on at least one of: real-time weather information, real-time air traffic conditions, fuel efficiency data, and historical flight data.

21. The EFB of claim 18, wherein the processor is further configured to:

provide real-time advisories to increase compliance with the potential alternative route;

real-time evaluation of alternative routes opportunities; and analyze alternative route opportunities based on historical flight records and data, wherein the historical flight records describe historical flights between a given city-pair.

22. The EFB of claim 18, wherein the processor is configured to operate on a request initiated by receipt of a new flight plan, wherein the request initiates a search for the potential alternative route between waypoints of the active flight plan, and wherein the processor is further configured to provide:

a first output indicative of finding a suitable alternative route based on the search; and a second output indicative of not finding the suitable alternative route and lack of relevant routes.

23. The EFB of claim 18, wherein the processor is further configured to operate on a continuous mode, wherein the processor regularly receives the active flight plan and a current position of the aircraft to initiate a search for the potential alternative route between the current position of the aircraft and waypoints towards a destination, and wherein the processor is configured to provide a third output indicative of finding a suitable alternative route based on the search.

24. The EFB of claim 18, wherein the historical flight records are retrieved from a historical flight data base, wherein the historical flight data base comprises at least one of: an operational flight plan (OFP), a departure airport, a destination airport, time and date of departure and arrival, sets of waypoints defining a plan flight trajectory, and aircraft position records.

25. The EFB of claim 18, wherein the processor is further configured to:

detect deviation from an actual aircraft trajectory during the flight of the aircraft based on historical flights; and identify mutual relations between the actual aircraft trajectory and a flown flight trajectory, wherein the mutual relations is identified based on:

an identified beginning position and an end position of the deviation; and determination that the flown flight trajectory is shorter than the actual aircraft trajectory.

26. The EFB of claim 24, wherein the OFP comprises route description made up by waypoints connected with route segments, wherein the waypoints and the route segments are published in an aeronautical information publication (AIP), and wherein the waypoints contain at least one of: an identifier, coordinates, reference to a starting position, reference to an in position.

* * * * *